Feb. 25, 1969

J. J. GOLNER 3,429,504

APPARATUS FOR MEASURING FILM

Filed Feb. 21, 1968

JEROLD J. GOLNER
INVENTOR.

BY

ATTORNEY

United States Patent Office 3,429,504
Patented Feb. 25, 1969

3,429,504
APPARATUS FOR MEASURING FILM
Jerold Julius Golner, Lowell, Mass., assignor to Borden,
Inc., New York, N.Y., a corporation of New Jersey
Filed Feb. 21, 1968, Ser. No. 707,039
U.S. Cl. 235—91                                     4 Claims
Int. Cl. G06m 1/00

ABSTRACT OF THE DISCLOSURE

This invention relates to an apparatus for measuring film or the like, which comprises a rotating drum, a pair of cylindrical tubes in peripheral engagement with said drum whereby rotation is imparted to both of said tubes, said film being wrapped about one of said tubes and entrained over the drum to engage the second tube whereby the film is transferred from said one tube to the other tube without the application of tensile forces. Means are provided for measuring the film as it is transferred from one tube to the other, as well as means for de-energizing the rotating drum and measuring means when the film has been transferred.

Background of the invention

In industry today, the production of rolls of film materials, such as polyethylene and polyvinyl chloride films, has met with widespread demand for use in wrapping food and non-food products. However, due to the physical makeup and properties of the film, various problems have arisen in the marketing of same. More particularly, great difficulty has been encountered in determining the actual length of film reeled onto the spool which is to be sold to the consumer. The reason for this problem is twofold; the film itself when wound under tension onto the spool is of such a resiliency and shrinkability that once the tensile stresses are removed, as for example occurs when the film is unwound by the consumer for use in wrapping, the film tends to shrink or spring back to its original dimension which is of a lesser length than that for which the purchaser paid. Another difficulty in determining the actual length of film of this type resides in the unreliable measuring devices currently being used to measure the footage of film wound onto the rotating spool. Generally, the methods for measuring film used today fall into two broad categories; a weight measurement test based on a comparison of the weight of a known length of film with the difference between the weight of a tube having film reeled thereon and an empty tube. Thus, when the film weight approaches the desired length of film which the manufacturer purposes to sell, this crude approximation serves as a basis for purveying a desired length of film to the consumer. A second method consists of an electric circuit which includes a microswitch mounted adjacent the spool onto which the film is being reeled and when the roll of film reaches a particular diameter thought to be approximately the desired length of film on the spool, the microswitch contacts the roll and the circuit shuts off the reeling machine. Obviously, both of these categories of methods for measuring film length are unsatisfactory since inconsistencies in the gauge thickness of the film, as well as other capricious variations which generally prevail in the manufacture of film materials, would produce poor results in film length measurements of these types. In fact, both of these methods have proven so inaccurate that in many instances variations in the length of film reeled onto the spool have produced tolerances of plus and minus 500 feet for a desired film length of approximately 4,000 feet. The principal problem encountered in developing an accurate measuring apparatus for film is that the known measuring devices used to determine the length of reel material such as cable, ropes, and the like would subject the material to high tensile stresses during the measuring operation. Since wrapping film would tear (or at least stretch) under the application of tensile stresses, these measuring devices are obviously unsuitable. If lesser tensile stresses were applied utilizing the same concept of measuring flexible members known in the art, though the film might not rupture, it would nonetheless be stretched and would spring back when the stress was removed so that the footage sold to the consumer would be less than that represented to him.

Summary of the invention

The present invention overcomes the heretofore stated problems in the measurement of deformable film by providing an apparatus which imparts no tensile forces to the film while registering an accurate reading of the footage of film reeled onto a tube. Additionally, the present invention includes a de-energizing assembly which will immediately terminate the operation of the measuring device utilized so that no additional film footage will be recorded during the diminishing rotation of the transfer drum used to carry out the measuring operation.

Briefly stated, the present invention includes a drum mounted for rotation, means for rotating the drum, first and second cylinders movably mounted to engage the periphery of said rotating drum at spaced points thereon, said film being wound about said first cylinder, entrained about a portion of the drum, and reeled onto the second cylinder as said drum is rotated, means driven by said drum for measuring the length of film transferred from said first cylinder to the second cylinder, and means engageable with said film along the portion entrained about said drum for de-energizing the rotating means and measuring means when the film has been completely transferred to the second cylinder.

Brief description of the drawing

The various features of the apparatus of this invention will become apparent from the following detailed description set forth in connection with the accompanying drawing which relates to the preferred embodiment of the present invention and is given by way of illustration.

Detailed description of the invention

Figure 1:
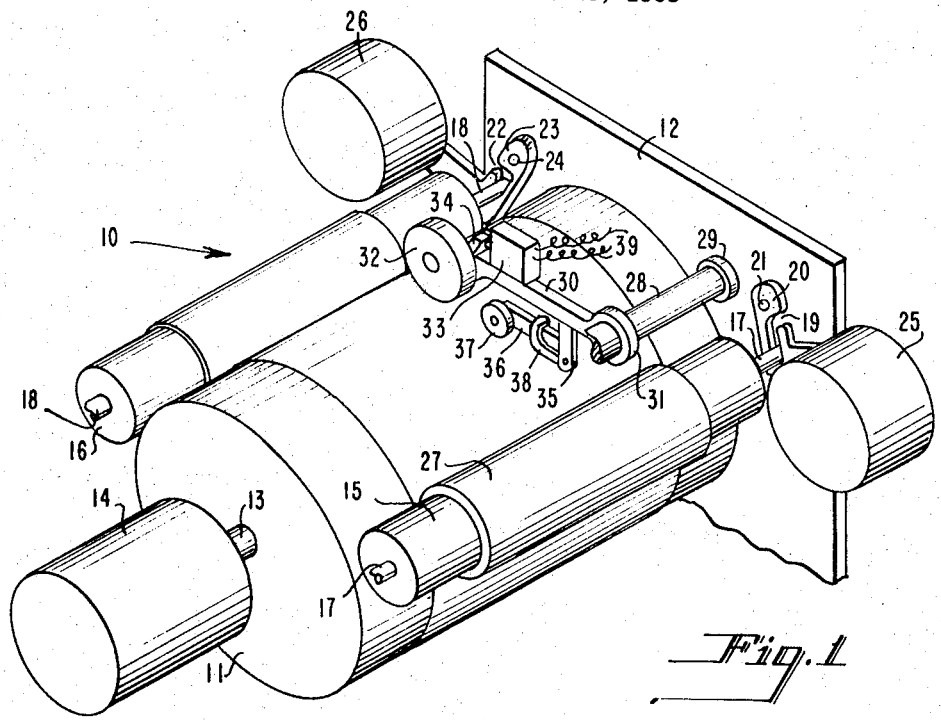
FIGURE 1 is an isometric perspective view of the present invention partially broken away to show various details thereof.

Referring now to the preferred embodiment of the present invention, and more particularly to FIGURE 1, there is illustrated a film transferring apparatus 10 which consists of a cylindrical drum 11 mounted at a right angle to an upright support 12. The drum 11 is axailly mounted on a shaft 13 which is rotatably mounted in a conventional manner on the upright base member 12 by journals (not shown). A second upright support parallel to the support 12 (not illustrated) is provided at the other end of drum 11 which also mounts the shaft 13 for rotation in journals in a manner similar to that on support 12. A motor means 14 is provided to impart rotational movement to the drum 11 and may be of any conventional type such as an electric, pneumatic or hydraulic motor. In the preferred embodiment, however, an electric motor is used. Parallelly disposed with respect to the drum 11 are a pair of tubes 15 and 16 which are slidably received over the shafts 17 and 18 respectively. The shafts 17 and 18 are removably mounted on bell crank members 20 and 23 respectively in L-shaped slots 19 and 22. A similar pair of bell crank members (not shown) are provided at the other end of the shafts 17 and 18 and removably mount the shafts in the same fashion from the second upright support as bell cranks 20 and 23. Each of the pairs of bell cranks are pivotally supported from their respective upright supports. The pivot pins 21 and 24, for example, pivotally mount bell cranks 20 and 23 on upright support 12 about an axis parallel to the axis defined by the shaft 13 and are a mirror image of the same mounting for the bell cranks at the other end of shafts 17 and 18. With the arrangement thus described, it should be apparent that the tubes 15 and 16 normally rotate to the position illustrated in FIGURE 1 to peripherally engage the rotatable drum 11. Weight discs 25 and 26 secured to the free ends of the bell cranks 20 and 23 provide a continuous downward gravitational force which insures that interperipheral engagement of the tubes onto the circumferential face of the drum 11 is maintained. A film 27 such as polyethylene or polyvinyl chloride which has been reeled on the tube 15 is to be transferred to the other tube 16 by frictional transfer from the interperipheral engagement of the two tubes by draping the film across the drum in the area between the two tubes on the circumferential face of the drum 11. Thus, as the drum 11 is rotated the tubes 15 and 16 are likewise rotated in opposite directions and the film is transferred from tube 15 to tube 16 by the relative movement of the cylindrical members with respect to one another. It should be appreciated that no tensile stresses are applied to the film 27 as it is transferred from the tube 15 to the tube 16 and thus the easily deformable film is never stretched.

Turning now to the means for measuring the amount of footage transferred from tube 15 to tube 16, there is illustrated a shaft member 28 suitably secured to the upright support 12 by a collar member 29 affixed thereto. An arm member 30 extends at right angles from the shaft 28 and is rotatably mounted on the latter by a sleeve member 31 integrally formed with the arm and slidably received over the shaft 28. At the free end of the arm 30 is a rotatably mounted measuring wheel 32 having a one-foot circumference which rides on top of the drum 11 and whose rotations are to be recorded to measure the footage of film transferred from tube 15 to tube 16. Also mounted on the arm 30 adjacent the measuring wheel 32 is an electric counter 33 of a known conventional type used in recording lineal footage of flexible materials which includes a microswitch assembly 34 actuated by an outwardly projecting portion on the rear face of the wheel to record the revolutions of the wheel 32 and consequently to record the footage of film transferred by the film transfer assembly. A conductor 39 interconnects the electric counter to the circuit illustrated in FIGURE 2 to be explained more thoroughly hereinafter. Also mounted on the rotatable arm 30 is a sensing apparatus which determines the presence or absence of film being transferred from one tube to the other. The sensing apparatus is mounted on a downwardly depending support 35 on the underside of arm 30 to which is pivotally mounted a secondary arm 36 spaced beneath arm 30. At the free end of the secondary arm 36 is sensor wheel 37 rotatably mounted thereon. Electric conductors are secured to the sensor wheel 37 (not shown in FIGURE 1) and connected to a solid state switching device 55 illustrated in FIGURE 2, as will be explained more fully hereinafter. A leaf spring member 38 secured between arm 36 and support 35 maintains a counterclockwise bias on the arm and in this way the wheel 37 is maintained in rotational engagement with the drum 11. It should be noted that the wheel 37 always rides on the drum at a position where the film 27 would be transferred beneath it and the wheel 37 would engage the metallic structure of the drum, which is at ground potential or zero voltage, only when the film has been completely transferred to the tube 16. Also, it should be understood that the film material is an insulating media and will keep the electric circuit connected through wheel 37 from reaching ground potential until the wheel engages the metallic surface of drum 11.

Figure 2:
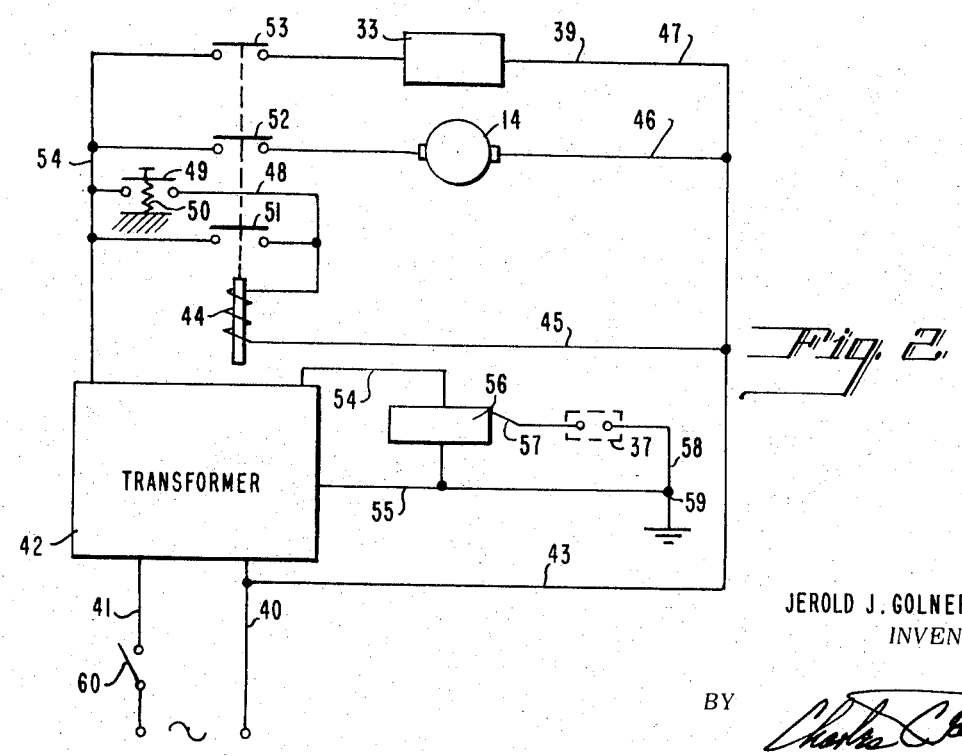
FIGURE 2 is a diagrammatical illustration of the electric circuit of the present invention.

Turning next to the electric circuit diagrammatically illustrated in FIGURE 2, there are shown conductors 40 and 41 which convey an electric potential of approximately 115 volts AC to the circuit set forth. A conventional switch 60 is provided on the conductor 41 to control the current flow to the circuit. Both conductors 40 and 41 are connected to an isolation transformer 42 at the input terminals thereof and supply AC voltage thereto. The transformer 42 is of a conventional type used in the prior art to reduce a relatively high AC voltage to a low DC voltage by way of a full wave rectifier and filter capacitor. A plurality of conductors 45, 46 and 47 mount a relay 44, the motor 14, and the counter 33 in parallel with a conductor 54 secured to the transformer and a conductor 43 connected to input conductor 40. A conductor 48 is connected between conductors 45 and 54 and includes a spring-loaded push-button switch 49 having a compression spring 50 to bias the switch to the open position. Each of the conductors 45, 46 and 47 include a relay switch 51, 52 and 53 respectively, as is shown, and each switch is controlled electromagnetically by the relay 44. Thus, when the push-button switch 49 is actuated, current flows to the relay 44 and the relay switches 51, 52 and 53 are closed and current flows throughout the circuit to motor 14 and counter 33 to initiate movement of the film transfer assembly.

An amplifier circuit which includes a solid state switching device 56 such as a silicon transistor or rectifier is connected to the amplifier terminals of the transformer by conductors 54 and 55. The gate terminal of the switching device is connected by conductor 57 to the sensor wheel 37, indicated schematically as an open electrical joint in FIGURE 2. A conductor 58 connected to the sensor wheel 37 leads to a ground 59, which in this case would be the metal drum 11. When the sensor wheel does contact the metal drum 11 due to the absence of insulating film beneath it, and the conductor 57 is reduced to ground potential, the switching device 56 is de-energized and the amplifier circuit connected to the transformer is broken. The transformer 42 no longer conveys current to the relay 44 and the latter is also de-energized. The de-energizing of relay 44 opens the relay switches 51, 52 and 53 and the motor and electric counter are cut off. The counter 33 no longer records revolutions of the measuring wheel 32.

*Operation*

In operation, a roll of film 27 on tube 15 is placed on the shaft 17 and an empty tube 16 is placed on shaft 18. The film 27 on the tube 15 is draped across the upper portion of the drum 11 and reeled about the tube 16 to which it is to be transferred. The switch 60 on the conductor 41 is closed and the push-button switch 49 is actuated to convey current to the relay 44. Thus, the current is received by the relay 44 which serves to energize latter, the relay switches 51, 52 and 53 are electromagnetically closed and current flows throughout the circuit. The push-button switch 49 returns to its original open position, but the relay switch 51 is closed to insure the flow of current to the relay 44. Likewise, the motor 14 is energized and the drum begins to rotate and film is transferred from tube 15 to tube 16. Concurrently, the electric counter 33 is energized and begins to record the revolutions of the wheel 32 to measure the footage of film being transferred between the two tubes. As soon as the film is completely transferred from tube 15 to tube 16, the sensor wheel 37 contacts the metal drum 11 and the joint between conductors 57 and 58 illustrated schematically in FIGURE 2 is closed and the gate terminal of the solid state switching device 56 reaches a ground potential, thereby de-energizing the device. This de-energizing is received by the transformer 42 and current is cut off to the relay 44. This immediately opens the relay switches 52 and 53, withdrawing the flow of current to the loader 14 and the counter 33 and the system is shut down until another tube of film is placed on the shaft 18 and the process is to be begun again.

Although one embodiment of the present invention has been herein illustrated and described, it will be evident to those skilled in the art that various modifications may be incorporated into the details of production without departing from the principles herein set forth.

What is claimed is:

1. Apparatus for measuring film comprising a drum mounted for rotation, means for rotating said drum, first and second cylinders parallelly disposed with said drum and movably mounted to engage the periphery of said rotating drum at spaced points thereon whereby rotation is imparted to both of said cylinders, said film being wound about said first cylinder, entrained about a portion of said drum, and reeled onto the second cylinder as said drum is rotated, means driven by the rotation of said drum for measuring the length of film transferred from said first cylinder to said second cylinder, means engageable with said film along the portion entrained about said drum for de-energizing the rotating means and measuring means when the film has been transferred to the second cylinder.

2. Apparatus according to claim 1 wherein said measuring means includes a wheel movably mounted to engage the periphery of the drum, and counter means operatively associated with said wheel to record the revolutions of said wheel as said drum is rotated, whereby the film is measured during the transfer from the first cylinder to the second cylinder.

3. Apparatus according to claim 1 wherein said deenergizing means includes sensing means movably mounted to ride on said film as it is transferred from said first cylinder to said second cylinder and switching means responsive to said sensing means to render inoperative the rotating means and measuring means when the film is no longer encountered by said sensing means.

4. Apparatus for measuring film comprising a drum mounted for rotation, an electric motor for driving said drum, first and second cylinders movably mounted to engage the periphery of said rotating drum at spaced points thereon whereby rotation is imparted to both of said cylinders, said film being wound about said first cylinder, entrained about a portion of said drum, and reeled onto the second cylinder as said drum is rotated, a wheel movably mounted to enageg the drum, an electric counter operatively associated with said wheel whereby as said wheel revolves said counter records the length traversed by said revolution of said wheel, switching means operatively associated with said electric counter and electric motor, and sensing means movably mounted to engage said film along the portion entrained about said drum whereby when said film is transferred from said first cylinder to said second cylinder said sensing means engages the drum and signals said switching means to de-energize said motor and counter.

References Cited

UNITED STATES PATENTS

| 1,959,268 | 5/1934 | Goldhammer et al. | 352—172 |
|---|---|---|---|
| 3,216,637 | 11/1965 | Cholet | 226—30 |
| 3,297,397 | 1/1967 | Grant et al. | 352—172 |

STEPHEN J. TOMSKY, *Primary Examiner.*

U.S. Cl. X.R.

226—11; 235—103; 242—67.3; 352—172